(12) United States Patent
Huang

(10) Patent No.: US 7,394,674 B2
(45) Date of Patent: Jul. 1, 2008

(54) BACKUP POWER SUPPLY WITH PARALLEL AC POWER SOURCE AND DC POWER SOURCE

(75) Inventor: Yung-Hsin Huang, Hsin-Tien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 461 days.

(21) Appl. No.: 11/022,795

(22) Filed: Dec. 28, 2004

(65) Prior Publication Data
US 2006/0139975 A1    Jun. 29, 2006

(51) Int. Cl.
H02J 7/00     (2006.01)
H02M 1/10    (2006.01)
(52) U.S. Cl. .......................................... 363/65; 307/64
(58) Field of Classification Search .................... 363/37, 363/65, 67; 307/58, 64–66, 2, 4, 52, 53, 307/55, 56, 72–75, 82
See application file for complete search history.

(56) References Cited

U.S. PATENT DOCUMENTS 5,751,564 A * 5/1998 Dien ............................. 363/37

2006/0139974 A1 * 6/2006 Dermark ....................... 363/65

FOREIGN PATENT DOCUMENTS

JP    2004254470 A    * 9/2004

* cited by examiner

Primary Examiner—Matthew V Nguyen
(74) Attorney, Agent, or Firm—Muncy, Geissler, Olds & Lowe, PLLC

(57) ABSTRACT

Provided is a backup power supply comprising at least one DC/DC power electrically connected to a DC power source for taking DC current therefrom prior to providing regulated DC current, at least one AC/DC power electrically connected to an AC power source for taking AC current therefrom prior to providing rectified DC current, and a power control device including a power balance unit, a power output circuit, and a detection circuit each interconnected the AC/DC power and the DC/DC power. The power control device can combine DC current from both the AC/DC power and the DC/DC power prior to providing to an electronic device (e.g., computer). The invention can continue providing electricity to the computer in the event of not only a malfunctioning of the AC/DC or DC/DC power but also a power outage of either the AC or DC power source.

7 Claims, 3 Drawing Sheets

US 7,394,674 B2

BACKUP POWER SUPPLY WITH PARALLEL AC POWER SOURCE AND DC POWER SOURCE

FIELD OF THE INVENTION

The present invention relates to power supplies and more particularly to a backup power supply system including an AC power source and a DC power source parallel connected thereto such that the backup power supply system can continue providing electricity to an electronic device in the event of either a malfunctioning of AC power source or DC power source or an external power outage.

BACKGROUND OF THE INVENTION

Conventionally, the power supply plays a key role in maintaining a stable and normal operation of a computer. Moreover, many computer components or peripherals (e.g., hard disk drive, CPU, CD-R, etc.) have a demand for high electricity quality (i.e., stable power supply) as technology makes progress rapidly. It is understood that an unstable power can lower the performance of a power supply and its connected equipment. Failure of an AC power source can cause, for example, a computer to shut down suddenly and losing the data that a user is working on. This is not desirable and is even disastrous in certain cases.

For solving the problem caused by a power outage, a conventional backup power supply is available. The power supply comprises a plurality of parallel powers. As such, the power supply can continue providing electricity to an electronic device in the event of a power failure of any one of them (i.e., operative powers continue providing electricity). A power supply can be classified as a DC/DC power connected to a DC power source and an AC/DC power connected to an AC power source based on the form of electricity conversion.

In one example, an available backup power supply comprises a plurality of parallel AC/DC powers connected to an AC power source. As such, the power supply can continue providing electricity to an electronic device in the event of a power failure of any one of them (i.e., operative powers continue providing electricity). However, all powers will stop operating immediately if the power failure is not caused by the malfunctioning of one power but due to interrupt an external power source. For solving this problem, many types of uninterruptible power supply (UPS) are available. The UPS can continuously provide electricity to an electronic device (e.g., a computer) in the event of a power failure. Unfortunately, however, the computer may stop operating immediately and lose the data that a user was working on. This is because the startup time of a UPS is relatively longer than the time required for maintaining a normal operation of a computer. That is, it is typical for a user to restart the computer in response to the power outage. This really bothers computer users.

In another example, an available backup power supply comprises a plurality of parallel DC/DC powers connected to a DC power source. The DC power source is comprised of a plurality of rechargeable batteries. As compared with an AC power source, a user may regularly charge the batteries in consideration of the power consumption of a connected electronic device (e.g., computer). However, electrical charge storing capability of a battery may lower gradually as the times of use increases. It is often that the determination of the capacity of a battery by a user is not correct. In one example, a consumed battery cannot maintain a normal operation of a computer. Moreover, the battery capacity is limited. A user has to continually buy many batteries for maintaining a normal operation of a computer. This is a huge investment and is not cost effective.

Thus, it is desirable to provide a novel backup power supply system in order to overcome the above drawbacks of prior art.

SUMMARY OF THE INVENTION

It is therefore an object of the present invention to provide a backup power supply system with parallel an AC power source and a DC power source. The present invention has the following advantages. It can continue providing electricity to a connected electronic device in the event of a malfunctioning of either an AC/DC power or a DC/DC power. Also, it can continue providing electricity to the connected electronic device in the event of a power outage of either an AC power source or a DC power source. Electricity quality is improved. The probability of losing data that a user is working on, for example, a connected computer is very low. Finally, it is cost effective.

The advantages of the present invention are realized by providing a backup power supply system comprising at least one DC/DC power electrically connected to a DC power source for taking DC current therefrom prior to providing regulated DC current; at least one AC/DC power electrically connected to an AC power source for taking AC current therefrom prior to providing rectified DC current; and a power control device including a plurality of components each interconnected the AC/DC power and the DC/DC power, the power control device adapted to combine DC current from both the AC/DC power and the DC/DC power prior to providing to an electronic device.

The above and other objects, features, and advantages of the present invention will become apparent from the following detailed description taken with the accompanying drawings.

DETAILED DESCRIPTION OF THE PREFERRED EMBODIMENTS

Figure 1:
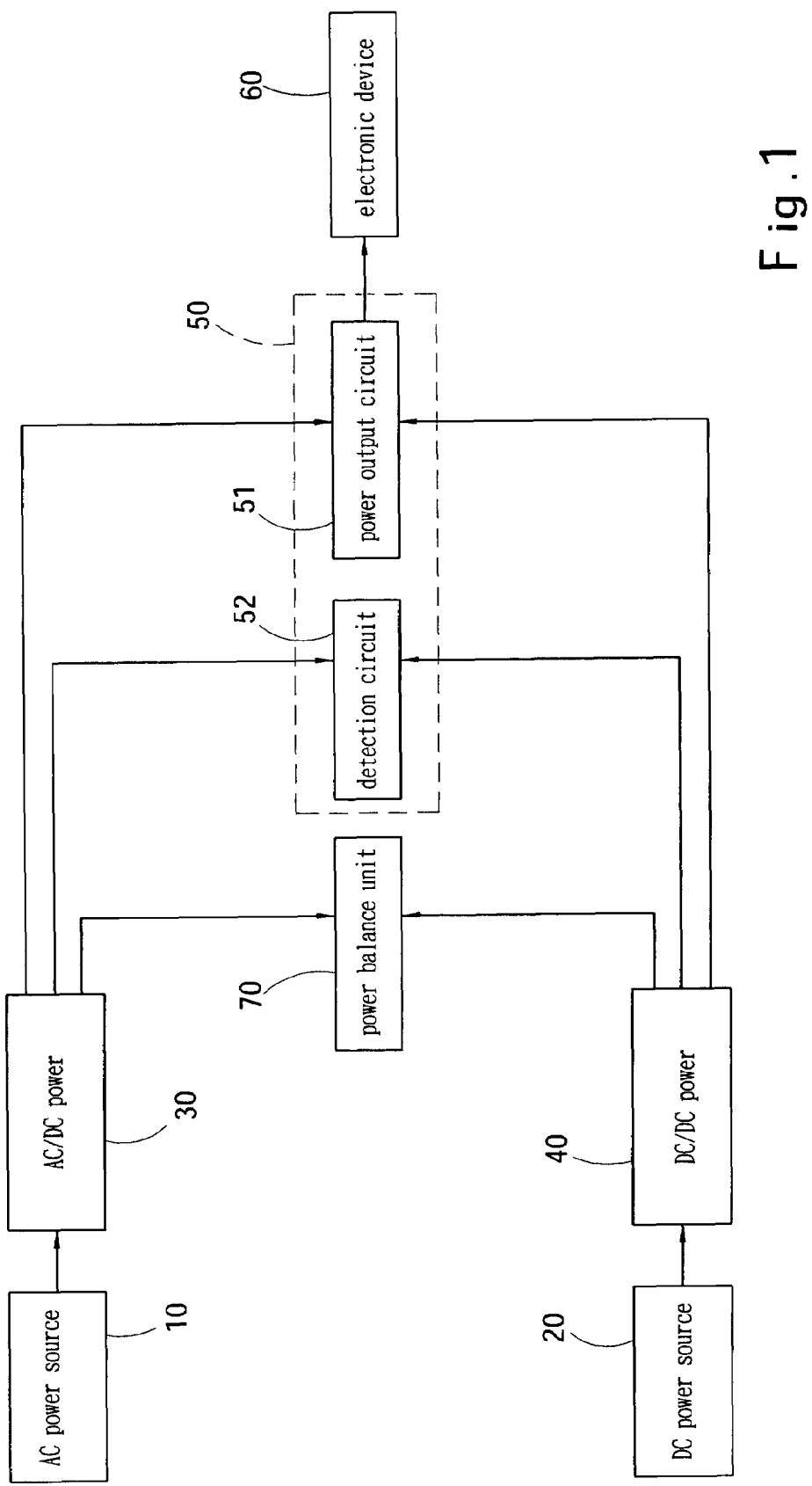
FIG. 1 is a block diagram of a first preferred embodiment of backup power supply system according to the invention.

Referring to FIG. 1, there is shown a backup power supply constructed in accordance with a first preferred embodiment of the invention. The power supply can be a linear or switching power supply. The backup power supply comprises a DC power source 20, a DC/DC power 40 electrically connected to the DC power source 20 for taking DC current therefrom prior to providing regulated DC current, an AC power source 10, an AC/DC power 30 electrically connected to the AC power source 10 for taking AC current therefrom prior to providing rectified DC current, and a power control device 50 including a power output circuit 51 interconnected the AC/DC power 30 and the DC/DC power 40 and a detection circuit 52 also interconnected the AC/DC power 30 and the DC/DC power 40. That is, the power output circuit 51 and the detection circuit 52 are parallel. The detection circuit 52 is adapted to detect outputs of both the AC/DC power 30 and the DC/DC power 40. The power output circuit 51 is adapted to combine DC current from both the AC/DC power 30 and the DC/DC power 40 into stable DC current prior to providing to an electronic device (e.g., computer) 60. The backup power supply further comprises a power balance unit 70 interconnected the AC/DC power 30 and the DC/DC power 40 for controlling a ratio of power output of the AC/DC power 30 to power output of the DC/DC power 40. Preferably, the power balance unit 70 is incorporated in the power control device 50.

In the embodiment, the backup power supply is a switching power supply. In operation, the power balance unit 70 is adapted to control the ratio of power output of the AC/DC power 30 to power output of the DC/DC power 40 in considering the power of the electronic device 60 prior to enabling the power output circuit 51 to provide a stable DC current to the electronic device 60. The power balance unit 70 is adapted to adjust the ratio of power output of the AC/DC power 30 to that of the DC/DC power 40 in the event of a malfunctioning of either the AC/DC power 30 or the DC/DC power 40. The detection circuit 52 may detect the malfunctioning prior to warning by flashing one or more LED indicators or activating a buzzer to make a buzzing sound. Advantageously, the backup power supply of the invention can continue providing electricity to the electronic device 60 in the event of a power outage as detailed below. For example, the DC power source 20 can operate normally in the event of a power outage of the AC power source 10. Also, the power balance unit 70 can adjust the power output ratio immediately. In another example, the AC power source 10 can operate normally in the event of a power outage of the DC power source 20. Also, the power balance unit 70 can adjust the power output ratio immediately. Fortunately, the probability of both the AC power source 10 and the DC power source 20 being interrupted at the same time is very low.

Figure 2:
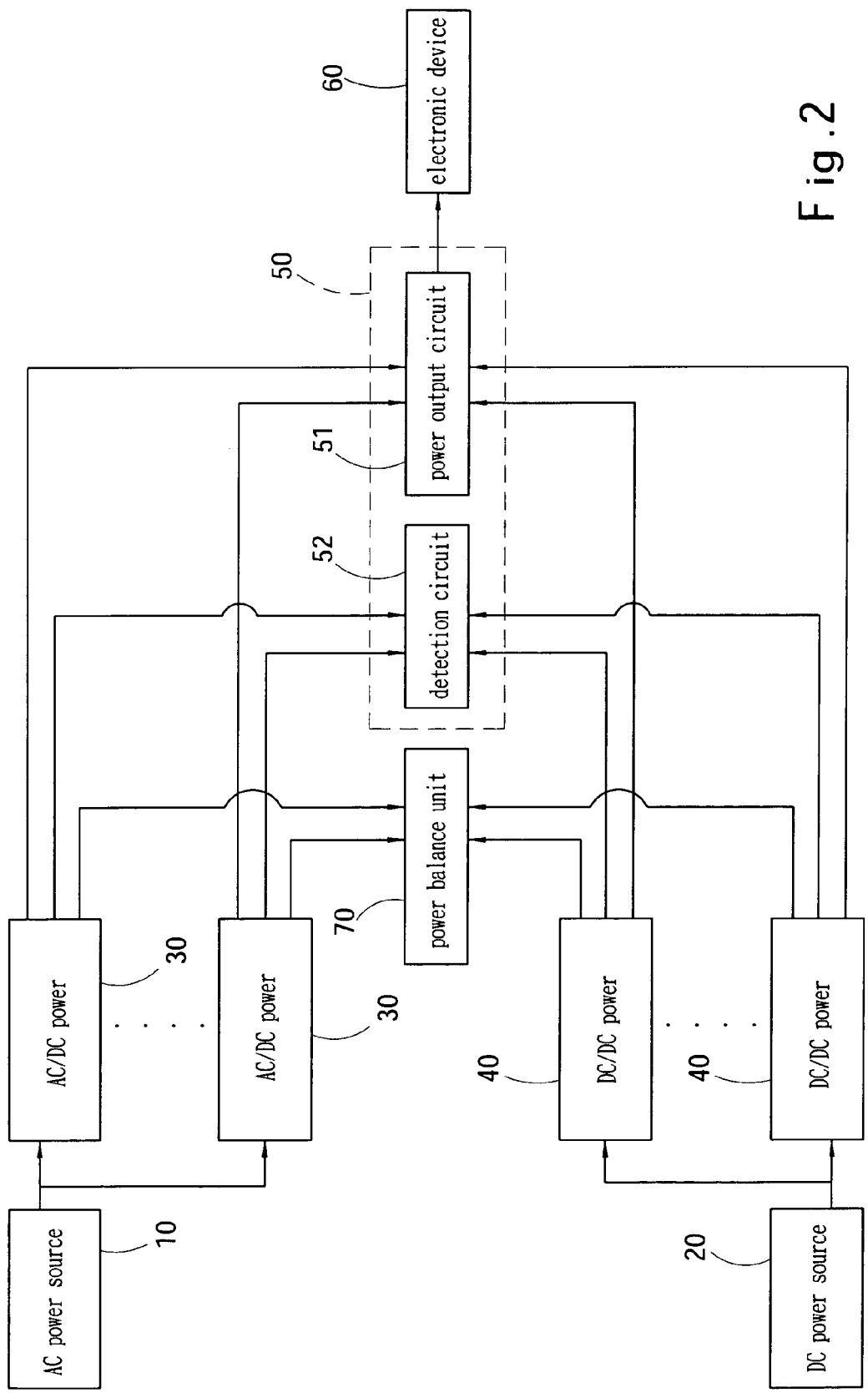
FIG. 2 is a block diagram of a second preferred embodiment of backup power supply system according to the invention.

Referring to FIG. 2, there is shown a backup power supply constructed in accordance with a second preferred embodiment of the invention. The characteristics of the embodiment are that a plurality of parallel AC/DC powers 30 are interconnected the AC power source 10 and the assembly of the power control device 50 and the power balance unit 70, and a plurality of parallel DC/DC powers 40 are interconnected the DC power source 20 and the assembly of the power control device 50 and the power balance unit 70.

Figure 3:
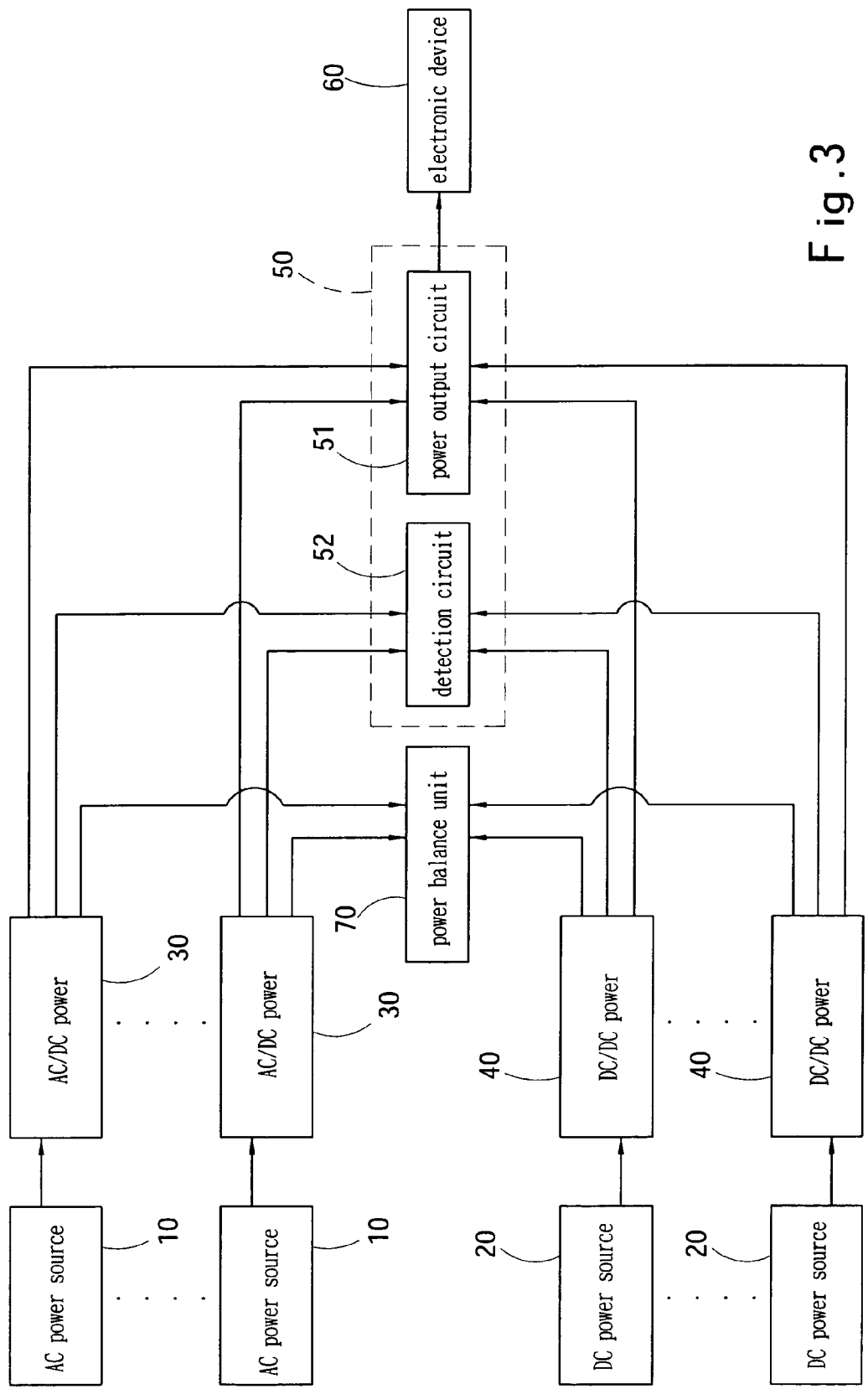
FIG. 3 is a block diagram of a third preferred embodiment of backup power supply system according to the invention.

Referring to FIG. 3, there is shown a backup power supply constructed in accordance with a third preferred embodiment of the invention. The characteristics of the embodiment are that a plurality of pairs of serially connected AC power source 10 and AC/DC power 30 are parallel connected to the assembly of the power control device 50 and the power balance unit 70, and a plurality of pairs of serially connected DC power source 20 and DC/DC power 40 are parallel connected to the assembly of the power control device 50 and the power balance unit 70. Each of the above embodiments is adapted to implement in a specific application.

In view of the above, an electronic device (e.g., computer) taking DC current from the backup power supply of the invention has the following advantages. Electricity quality is improved. The probability of losing data that a user is working on the computer is very low. Investment in buying the equipment of DC power source (e.g., rechargeable batteries) 20 is decreased since AC power source 10 also plays an important role in providing electricity to the computer. Finally, it is cost effective.

While the invention herein disclosed has been described by means of specific embodiments, numerous modifications, and variations could be made thereto by those skilled in the art without departing from the scope and spirit of the invention set forth in the claims.

What is claimed is:

1. A backup power supply system comprising:
at least one DC/DC power electrically connected to a DC power source for taking DC current therefrom prior to providing regulated DC current;
at least one AC/DC power electrically connected to an AC power source for taking AC current therefrom prior to providing rectified DC current; and
a power control device including a plurality of components each interconnected to the AC/DC power and the DC/DC power, the at least one DC/DC power electrically connected to the DC power source being connected in parallel with the at least one AC/DC power electrically connected to the AC power source, the power control device combining DC current from both the AC/DC power and the DC/DC power prior to provide power to an electronic device; wherein a first component of the power control device is a power balance unit for controlling a ratio of power output of the AC/DC power to that of the DC/DC power.

2. The backup power supply system of claim 1, wherein a plurality of DC/DC powers is parallel connected to the DC power source.

3. The backup power supply system of claim 1, wherein a plurality of DC/DC powers is individually interconnected to the DC power source and the power control device.

4. The backup power supply system of claim 1, wherein a plurality of AC/DC powers is parallel connected to the AC power source.

5. The backup power supply system of claim 1, wherein a plurality of AC/DC powers is individually interconnected to the AC power source and the power control device.

6. The backup power supply system of claim 1, wherein a second component of the power control device is a power output circuit for combining DC current from both the AC/DC power and the DC/DC power prior to providing to the electronic device.

7. The backup power supply system of claim 6, wherein a third component of the power control device is a detection circuit for detecting outputs of both the AC/DC power and the DC/DC power.

* * * * *